Aug. 5, 1924.　　　R. B. SMITH　　　1,503,610
DENTAL TOOL
Filed Oct. 9, 1923
*Fig. 1.*　　*Fig. 2.*　　*Fig. 3.*
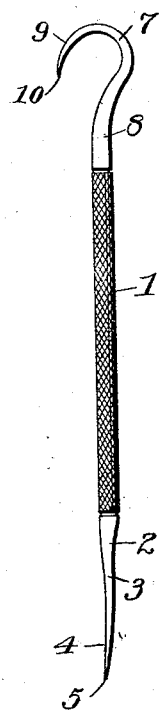
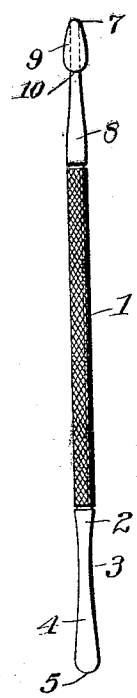
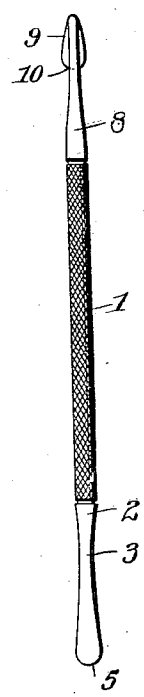
Inventor
Robert B. Smith,
By
Attorney Patented Aug. 5, 1924.

1,503,610

UNITED STATES PATENT OFFICE.

ROBERT B. SMITH, OF BROKEN BOW, NEBRASKA.

DENTAL TOOL.

Application filed October 9, 1923. Serial No. 667,570.

*To all whom it may concern:*

Be it known that I, ROBERT B. SMITH, a citizen of the United States, residing at Broken Bow, in the county of Custer and State of Nebraska, have invented new and useful Improvements in Dental Tools, of which the following is a specification.

The invention relates to a dental tool.

The object of the present invention is to provide a simple, practical and efficient dental tool of strong, durable and comparatively inexpensive construction adapted for individual use by the general public and capable of enabling inexperienced persons, not skilled in the use of dental tools and without the professional services of a dentist, to scale tartar from their own teeth at both the inner and outer side faces thereof without injuring the gums or causing hemorrhage or pain.

The further object of the invention is to provide a dental tool of this character made of a single piece of metal so as to be thoroughly sanitary, and comprising a handle provided at its ends with two instruments, one for use on the outer and the other for use on the inner sides of the teeth.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawing, in which like characters of reference designate corresponding parts in the several views:—

Figure 1 is a side elevation of a dental tool constructed in accordance with this invention.

Figure 2 is a front elevation of the same.

Figure 3 is a rear elevation of the same.

In the accompanying drawing, in which is illustrated the preferred embodiment of the invention the dental tool comprises in its construction a straight handle 1 having a roughened surface and provided at one end with a nearly straight shank 2 having a slight curvature longitudinally of the tool and tapered and rounded at the inner portion at 3 and provided at the outer portion with an inwardly tapered blade 4 having an end cutting edge 5 curved transversely and forming a substantially semi-circular chisel or cutting portion. The instrument thus formed at one end of the handle is adapted for use for scaling tartar from the outside of the teeth.

The handle is provided at its other end with a shank having a continuously curved substantially hook-shaped outer portion 7 and a tapered rounded inner portion 8. The substantially hook-shaped outer portion 7 is provided with an inwardly tapered terminal portion or bill 9 having an end cutting edge 10 curved transversely and forming a substantially semi-circular chisel or cutting portion adapted to operate on the teeth at the inner sides thereof for scaling the tartar therefrom. The terminal bill or cutting portion extends inwardly in a direction longitudinally of the handle in spaced relation thereto and will thereby enable a person to easily scale the tartar from the inner sides of his teeth. The instrument by being constructed of a single piece of steel or other suitable material, may be easily maintained in a thoroughly sanitary condition and by being equipped at its ends with instruments of the character described will enable a person, without the use of a dentist, to easily, properly and rapidly remove tartar from his own teeth without injuring the gums or the teeth.

What is claimed is:

1. A dental tool comprising a handle provided at one end with a shank having a continuously curved approximately hook-shaped outer portion having an inwardly tapered terminal blade forming a continuation of the hook-shaped portion and extending inwardly longitudinally of the handle in parallelism therewith and spaced therefrom, said blade constituting the bill of the hook-shaped portion and having an end cutting edge adpated to scale tartar from the inner sides of the teeth.

2. A dental tool comprising a straight handle provided at one end with a nearly straight shank having a terminal cutting edge, said handle being provided at the other end with a shank having a continuously curved approximately hook-shaped portion, the hook-shaped portion being provided with a terminal blade constituting the bill of the hook-shaped portion and provided with an end cutting edge curved transversely forming a substantially semi-circular chisel edge.

In testimony whereof I have hereunto set my hand.

ROBERT B. SMITH.